United States Patent Office 3,685,993

Patented Aug. 22, 1972

3,685,993

LITHOGRAPHIC PLATE WITH RESIN BINDER CONTAINING SILVER SOAP OXIDIZING AGENT

Joan M. W. Mukherjee, St. Paul, Minn., assignor to Minnesota Mining and Manufacturing Company, St. Paul, Minn.

No Drawing. Filed Aug. 3, 1970, Ser. No. 60,777

Int. Cl. G03f 7/02, G03c 1/72

U.S. Cl. 96—33 9 Claims

ABSTRACT OF THE DISCLOSURE

Lithographic printing plate containing metal soap oxidizing agent together with complex of high molecular weight water-soluble organic polymer and polymeric phenolic reducing agent in hydrophilic binder system becomes ink receptive when heated. The system may be made light-sensitive.

This invention relates to the manufacture and application of lithographic or offset duplicating plates. In one important aspect the invention relates to a lithographic plate on which ink receptive images may be formed by a process involving exposure to a light image and subsequent heating. In other aspects the invention relates to lithographic plates which may be imaged by direct localized heating or by application at image areas of reactive inks or the like, followed by heating.

Hydrophilic water-insoluble complexes or association products of a water soluble polymeric ether and a phenolic resin have been disclosed, for example in U.S. Pat. No. 3,125,544, and their use in lithographic printing plates has been proposed in U.S. Pat. No. 3,231,377. The lithographic plate described in that patent additionally contains a photosensitizing compound, such for example as iodoform, and upon being exposed for about 10 minutes to radiation from a carbon arc is rendered ink-receptive in the exposed areas.

U.S. Pat. No. 3,168,864 describes a lithographic plate which may be imaged by direct localized heating, e.g. in the thermographic copying process; the resulting image being both visible and selectively ink-receptive. The plate coating contains an oleophilic polymer dispersed in a hydrophilic binder, and a heat-sensitive reactant system which undergoes a visible change when heated. Upon heating, the polymer is released to the surface of the coating to form ink-receptive image areas, which are made visible by reaction at the heated areas of the components of the reactant system.

The lithographic plate of the present invention contains a water-insoluble hydrophilic complex or association product of a water soluble polymer and a phenolic resin as well as a reactant system which undergoes a visible change on heating. However the plate contains no dispersed oleophilic polymer, and the phenolic resin component serves as one of the components of the reactant system. Furthermore the plate in one form may be provided with image areas which are both ink-receptive and visibly distinct either by simple exposure to thermographic or other localized heating, or in slightly modified form may be similarly imaged either by applying indicia with a reactive ink or by brief exposure to a light image, followed by uniform heating.

Various classes of polyether-polyphenolic complexes as described in Pat. No. 3,125,544 and more particularly in Pat. No. 3,231,377 all have some utility in the practice of the present invention. Additionally it has now been found possible to form similarly useful complexes of the polyphenolic compounds with water-soluble high molecular weight polyamine and polyamide polymers. Complexes of the compound 2,4,6-tris(3,5 - ditertiarybutyl - 4-hydroxy)phenol, or of novolak resin reaction products of formaldehyde with phenols such as phenol, 4-methoxyphenol, 4-(methylthio)phenol, m-cresol, o- or p-tertiarybutylphenol, ditertiaryalkyl phenols such as 2,6-ditertiarybutyl phenol, or mixtures thereof, or of resole resins, e.g. of formaldehyde and resorcinol, with high molecular weight water soluble polymers such as polyvinylpyrrolidone, copolymer of methylvinylether and maleic anhydride, gelatin, anionic acrylamide polymer, hydroxyethylcellulose, poly(ethylene oxide), and poly-N-methylethyleneimine, have specifically been found to give good results in these coatings and coated plate materials.

The phenolic compounds are substantially insoluble in water but are soluble in aqueous alkaline solutions and/or in organic solvents, such as the lower alcohols or ketones. The complexes of these compounds with the ether, amine or amide water-soluble polymers are also substantially insoluble in water although still hydrophilic. The complexing reaction is believed to involve hydrogen bonding, as indicated by the presence of the phenolic hydroxyl groups of the phenolic resin and the strongly electronegative oxygen or nitrogen atoms of the water-soluble polymer.

The complexes may be prepared, as described in the patents, using ratios of about from one to six parts of the water soluble polymer to one part of the phenolic polymer. The complex will ordinarily be most conveniently prepared by simply mixing together solutions of the two components in miscible volatile liquid solvents; but other equally effective procedures will be apparent and may be used. As an illustration, some or all of the other components may be dissolved or dispersed in one or both of the polymer solutions prior to final mixing.

Light-stable silver salts, and particularly the silver soaps of long chain fatty acids as used in Pat. No. 3,168,-864, are particularly desirable as reactants for forming the visible image. Silver behenate is a preferred example; but silver stearate, silver hydrogen phthalate, and many other silver salts may be used. Reduction of the silver salt by heat-induced reaction with a phenolic or equivalent mild reducing agent results in the liberation of free silver which then appears as a distinctly visible deposit. Image density may if desired be increased by incorporation in the coating of known toners for the silver image; phthalazinone is an outstandingly effective example.

The waxy nature of the preferred silver salts makes them difficult to disperse, particularly in aqueous vehicles. It is therefore good practice to include in the coating composition a small proportion of a wetting or dispersing agent. These materials provide a further advantage in increasing the hydrophilicity of the dry coating, so that the background areas are easily and quickly wet out on the press. The addition of clays and other adjuvants to the composition for this purpose is likewise helpful in many instances. These several additives are particularly helpful where the silver soap is accompanied by large proportions of free fatty acid. The organic wetting agents are useful also in those compositions and coatings containing substantially no free fatty acid and which are designed to be transparent. but clays and other opacifying agents, at least in large proportions, must then be excluded.

The combination in the dry lithographic plate coating of silver salt and phenolic resin complex, particularly in the presence of phthalazinone or the like, provides a reactant system which undergoes prompt reaction when the sheet is briefly heated as in the thermographic copying process. The image areas are thereby made distinctly visible and also strongly ink-receptive. The resulting lithographic master may be promptly attached to the press and used in the preparation of large numbers of copies.

For some purposes it is found desirable to inscribe or print various indicia on the plate, either by hand or with fixed or movable type or in some other manner. In such cases the indicia may be applied as an ink or other deposit containing a catalyst for the reaction. Simple heating of the printed sheet then causes selective reaction at the image areas, with development of the visible and ink-receptive image. Phthalazinone serves admirably as such a catalyst in addition to providing a toning action. The phthalazinone component is therefore omitted from such coating compositions and is instead applied locally, for example as a dilute solution in the form of a liquid ink, or as a component of a carbon paper or other transfer sheet, or by transfer from the suitably treated ribbon of a typewriter.

Another method for imparting an ink-receptive image to the plate coating is by use of a pre-exposed photosensitive intermediate sheet material containing a reaction-initiating volatizable photosensitive component. One such class of materials, described in U.S. Pat. No. 3,094,417, is exemplified by 4-methoxy-1-naphthol. In association with a suitable sensitizing dye, this material is found to lose its reactivity when exposed to visible light. After exposure to a light-image, as by reflex exposure against a printed original, the intermediate sheet is heated in contact with the lithographic plate containing the polymer complex, silver soap and toner. The traces of photosensitive reactant remaining on the intermediate initiate a reaction in corresponding image areas of the plate coating and produce a visible and ink-receptive image from which copies may then be made by the lithographic printing process.

A still further, and in many respects far superior method of forming a lithographic master and coming within the ambit of the present invention involves photosensitization of the plate coating itself. Photosensitization is conveniently accomplished in accordance with principles described in U.S. Pat. No. 3,457,075, e.g., by incorporating with the light-stable silver salt a significant small amount, e.g. up to about ten molar percent, of a source of halide ion and thereby converting a small portion of the silver soap to photosensitive silver halide. Sensitizing dyes may be included, and the sheet may thus be made highly sensitive to visible light. Brief exposure to a light-image, for example by exposure through a photographic negative, followed by moderate uniform heating, develops a visible and ink-receptive image. Under somewhat different conditions it is possible alternatively to form positive images, the non-light-struck areas developing to the visible and ink-receptive condition while the light-struck areas remain unchanged.

Plates of the invention may be prepared by applying the coatings to paper, plastic film, metal foil or other desired base or substrate which may be pretreated in any desired manner, e.g. by mechanical roughening or by subbing or priming or in other ways. The thickness of coating is not critical although for reasons of economy and for most effective press operation the coating should be as thin as possible consistent with full uniform coverage and adequate reactivity. Ratios of water soluble resin and phenolic resin of between 1:2 and 2:1 are found to yield best results with most resins but in any event the ratio should be such as to yield a hydrophilic but water-insoluble coating which is substantially completely resistant to inking on the press at non-image areas. The water soluble resin component of the polymer complex may be given a further cure, in which case the ratio of initially water soluble to phenolic resin may be increased.

Analogously, the ratio of silver salt to polymeric complex may vary greatly as the specific components and the ratio of polymers is varied, with the proviso that the amount of silver salt be sufficient to provide both full visibility and adequate ink-receptiveness of image. Good results have been obtained with coatings wherein the ratio of silver salt to polymer complex is between about 5:1 and about 1:4.

The following examples, in which all parts are by weight unless otherwise indicated, are offered for the purpose of further illustrating but not limiting the invention.

EXAMPLE 1

| | | |
|---|---|---|
| Homogenizate of 10 parts silver behenate in 90 parts 2-butanone | gm | 50 |
| p-Cresol-formaldehyde novolak resin | gm | 2 |
| 2-butanone | ml | 40 |
| 2-propanol | ml | 60 |
| 1(2H) phthalazinone | gm | 0.4 |
| Surfactant ("Triton GR-7") | gm | 0.5 |
| Solution of 2% poly(ethylene oxide) in dichloromethane | gm | 100 |
| 10% mercuric bromide solution in methanol | ml | 2 |
| 0.05% sensitizing dye solution in acetone | ml | 2 |

The novolak resin is prepared by heating together 108 gm. of p-cresol, 24 gm. of paraformaldehyde, 2 gm. of trichloroacetic acid and 50 ml. of toluene for two hours at 80–90° C. with vigorous stirring. The mixture is then neutralized with ammonium hydroxide and the resin recovered, by steam distillation, washing and decanting, cooling and drying, as a solid resin.

The sensitizing dye is 3-allyl-5-[(3-ethyl-2-(3H)-benzoxazoylidene)ethylidene] - 1 - methyl - 2 - thiohydantoin.

"Triton GR-7" surfactant is dioctyl sodium sulfosuccinate.

Suitable precautions are taken throughout the process to protect the light-sensitive material from unwanted exposure to light.

The novolak resin and phthalazinone are dissolved in 2-butanone. The poly(ethylene oxide) solution and 2-propanol are added and mixed in well. The mercuric bromide solution and the surfactant are added to the silver behenate homogenizate with thorough mixing. The two compositions are mixed together with addition of the sensitizing dye, and the mixture is promptly coated at a wet thickness of 5 mils on 3 mil "Mylar" polyester film.

After drying, the plate is ready for use. Exposure to 250 foot-candle-seconds from a tungsten filament lamp through a negative, and heat development for about 10 seconds at about 140° C., give a plate ready for the press with no washing steps. The plate is wet or "etched," as usual, on the press. No degradation of the plate is apparent after 200 copies have been run off the press, at which time the run is discontinued.

Another plate made as just described is subjected to exposure through a continuous tone step wedge followed by heat development at 140° C., resulting in a print on which five steps of the wedge can be distinguished, showing that the system is capable of printing continuous tones.

By increasing the amount of novolak resin to three grams and decreasing the phthalazinone to 0.25 grams in the formula of the example and by then exposing at 10 foot-candle-seconds and developing by heating at 150° C. it is possible to obtain a positive rather than a negative image. The resulting lithographic master produces positive prints but with some toning at non-image areas.

EXAMPLE 2

Mixture A:

| | |
|---|---|
| Homogenizate of one part silver behenate in nine parts 2-propanol | 50 parts. |
| Mercuric bromide | 0.2 parts. |
| Polyvinyl butyral | 2 parts. |
| Phthalazinone | 0.1 parts. |
| Sensitizing dye | As in Example 1. |

The homogenizate and mercuric bromide are mixed together, the polyvinyl butyral is added, and the mixture is ball milled until the polymer is completely dissolved. The phthalazinone is added and milling continued for ¾ hour. The dye is then mixed in and the mixture is coated on a polyester film base using a 3 mil coating orifice, and dried.

Mixture B:

| | Parts |
|---|---|
| Solution of 3% polyethylene oxide in dichloromethane | 67 |
| p-Cresol-formaldehyde novolak resin of Example 1 | 2 |
| 2-butanone | 24 |

The resulting solution is applied over the dried first coating at a thickness of two mils and the sheet is again dried, these operations being carried out under darkroom conditions and at room temperature.

The coating is exposed through a negative to light from a tungsten filament lamp at 250 foot-candle-seconds. Heating at 152° C. for 10 seconds develops a sharp black ink-receptive image, and the plate operates for a minimum of 200 copies on the press without observable degradation.

EXAMPLE 3

| | Parts |
|---|---|
| Silver behenate | 5 |
| p-Cresol-formaldehyde novolak resin | 2 |
| Polyethylene oxide ("Polyox WSR-301") | 2 |
| Surfactant ("Triton GR-7") | 0.5 |
| Phthalazinone | 0.4 |
| 2-propanol | 48 |
| Dichloromethane | 98 |
| Methylethyl ketone | 77 |

The silver behenate is dispersed in a portion of the ketone by homogenizing. The novolak resin and phthalazinone are dissolved in the remainder of the ketone. The polyethylene oxide is dissolved in the dichloromethane. The several mixtures and remaining solvent are mixed together and the mixture coated on polyester film at a wet thickness of 5 mils. The dry coating is hydrophilic.

The plate is placed with the uncoated surface against and in heat-conductive contact with a differentially radiation-absorptive printed original which is then briefly exposed, through the transparent plate, to intense infrared radiation. The technique is known as thermographic front-printing, and results in duplication of the infra-red-absorptive printed characters as a visible and ink-receptive image on the coated plate. The plate is then placed on the press, wet out, and used in making copies by lithographic printing.

EXAMPLE 4

| | Parts |
|---|---|
| Silver behenate | 2.5 |
| Novolak resin of preceding examples | 1 |
| Hydroxyethyl cellulose ("Natrosol 300HH") | 1 |
| Clay (optional) | 1.5 |
| "Triton GR-7" surfactant | 0.25 |
| Phthalazinone | 0.2 |
| Water | 102.5 |
| Dimethylformamide | 30 |
| 2-propanol | 22.5 |

The homogenizate of silver behenate and surfactant in 2-propanol is added to a mixture of clay and hydroxyethyl cellulose in water and phthalazinone and novolak in dimethylforamide. The well-mixed composition is coated on a film backing, dried, and imaged as in Example 3, and the imaged sheet is used effectively in lithographic printing.

Equivalent results are obtained with similar coatings in which the silver behenate is replaced with an equal weight of silver stearate or silver acid phthalate.

Similarly useful coatings and lithographic plates are obtained by substituting for the one part of hydroxycellulose in the formula of Example 4 any of the following:

| | Parts |
|---|---|
| 5% solution in methanol of high mol. wt. polyvinylpyrrolidone | 36.25 |
| 40% solution in water of poly-N-methylethyleneimine | 3.5 |
| 1% solution in methanol of "Reten A-1" polyacrylamide | 75 |
| 5% solution in methylethylketone of "Gantrez AN" methylvinylethermaleic anhydride copolymer | 25 |

with appropriate modification of the solvent mixture employed.

EXAMPLE 5

Silver behenate half soap, a blend of equimolar proportions of silver behenate and behenic acid obtained by precipitation from silver nitrate and the sodium salt of commercial behenic acid, is dispersed in 2-propanol containing a wetting agent and mixed with phthalazinone and novolak resin dissolved in dimethylformamide, hydroxyethyl cellulose dissolved in water and ethanol, and clay and colloidal silica dispersed in water. The mixture is coated at 7 mils on lithographic paper. After drying, the plate is imaged thermographically and used to provide copies by lithographic printing.

The composition after removal of solvent contains

| | Parts |
|---|---|
| Half soap | 2.5 |
| Novolak (as in Example 1) | 2 |
| Hydroxyethyl cellulose | 2 |
| Clay | 14 |
| Silica | 2 |
| Phthalazinone | 1 |
| Dioctyl sodium sulfosuccinate | 0.2 |

Silver behenate full soap is equally effective when substituted for the half soap in this example.

EXAMPLE 6

A novolak resin is prepared as follows. A mixture of p-cresol (108 g.), paraformaldehyde (90 g.) and sodium acetate (25 g.) in water (150 g.) is refluxed for six hours. The resin is purified by washing with hot water and decanting. It is then taken up in acetic acid (150 ml.), and 2,6-ditertiarybutylphenol (137 g.) is added. Gaseous hydrogen chloride is bubbled for 2½ hours into the mixture, which is then permitted to stand for several days at room temperature. The resulting resin is purified by filtration in solution in ether, extraction with sodium bicarbonate solution, washing with water, and steam distillation with toluene. The resulting sirupy mass cools to a brittle yellow solid.

A composition containing one part of the solid resin, one part of hydroxyethyl cellulose, 2.5 parts of silver behenate, and 0.25 part of phthalazinone in a mixture of 2-propanol, dimethylformamide, ethanol and water is coated on a film backing at a thickness of 5 mils, and dried to form a lithographic plate.

A photosensitive intermediate sheet as described in U.S. Pat. No. 3,094,417, containing 4-methoxy-1-naphthol and erythrosin in ethyl cellulose on a thin transparent backing, is exposed in reflex position against a printed original and is then heated in face-to-face contact with the lithographic plate. A visible and ink-receptive image of the printed original is obtained on the plate, which is then placed on the press, wet out, and used in making copies by lithographic printing.

EXAMPLE 7

A lithographic plate is prepared in the form of a coating on a film base of a mixture of 2.5 parts silver behenate, 0.75 part p-cresol-formaldehyde novolak resin, 1 part of hydroxyethylcellulose, and 0.16 part of dioctyl sodium sulfosuccinate. A dilute solution of phthalazinone in dichloromethane is used as an ink with which indicia are inscribed on the coated surface, and the plate is then heated at 100° C. A visible and ink-receptive image is developed. The plate is used in making copies by lithographic printing.

What is claimed is as follows:

1. A composition useful as a coating for a lithographic printing plate, comprising a complex of a heat fusible phenolic resin and a high molecular weight water-soluble poly-ether, -amine or -amide polymer, and an organic silver salt oxidizing agent for said resin.

2. A lithographic printing plate comprising a base sheet coated with the composition of claim 1.

3. The plate of claim 2 wherein the coating contains phthalazinone.

4. The plate of claim 3 wherein the phenolic resin is a reaction product of phenols comprising a ditertiaryalkylphenol.

5. The plate of claim 3 wherein the coating contains photosensitive silver halide.

6. The plate of claim 5 wherein the coating contains a sensitizing dye and is activated on exposure to visible light.

7. The plate of claim 2 wherein the water soluble resin is hydroxyethylcellulose, the phenolic resin is a p-cresol-formaldehyde novolak resin, and the silver salt is silver behenate.

8. The plate of claim 7 wherein a portion of the silver is converted to photosensitive silver halide.

9. The method of providing ink-receptive visible image areas on a lithographic printing plate having a hydrophilic coating containing a complex of a heat fusible phenolic resin and a high molecular weight water-soluble poly-ether, -amine or -amide polymer and in addition containing an organic silver salt oxidizing agent for said resin, comprising effecting a catalysis at said image areas of said coating to render the same more readily reactive on heating, and heating said sheet at least at said image areas to impart ink-receptivity thereto.

References Cited

UNITED STATES PATENTS

| | | | |
|---|---|---|---|
| 3,231,377 | 1/1966 | Dickinson et al. | 96—33 |
| 3,094,417 | 6/1963 | Workman | 96—28 |
| 3,457,075 | 7/1969 | Morgan et al. | 96—67 |
| 3,168,864 | 2/1965 | Brandl et al. | 117—36.2 |
| 3,125,544 | 3/1964 | Winslow et al. | 260—2 |

NORMAN G. TORCHIN, Primary Examiner

E. C. KIMLIN, Assistant Examiner

U.S. Cl. X.R.

96—114, 67

UNITED STATES PATENT OFFICE

CERTIFICATE OF CORRECTION

Patent No. 3,685,993 Dated August 22, 1972

Inventor(s) Joan M. W. Mukherjee

It is certified that error appears in the above-identified patent and that said Letters Patent are hereby corrected as shown below:

Column 2, line 3, "hydroxy)phenol" should read --hydroxybenzyl)phenol--.

Column 2, line 63, "transparent. but" should read --transparent; but--.

Signed and sealed this 3rd day of December 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334